United States Patent [19]

McKnight et al.

[11] 4,174,775
[45] Nov. 20, 1979

[54] APPARATUS FOR CONTINUOUSLY ORIENTING PLASTIC AND OTHER TYPES OF BOTTLES

[75] Inventors: Hugh P. McKnight, Indianapolis; Kenneth B. Welty, Mooresville, both of Ind.

[73] Assignee: Eli Lilly and Company, Indianapolis, Ind.

[21] Appl. No.: 789,056

[22] Filed: Apr. 20, 1977

[51] Int. Cl.² .................................... B65G 47/24
[52] U.S. Cl. ................................ 198/397; 221/173; 221/186
[58] Field of Search .............. 198/393, 397, 398, 399, 198/392; 221/167, 168, 169, 171, 172, 173, 182, 186, 157, 158

[56] References Cited

U.S. PATENT DOCUMENTS

| 620,350 | 2/1899 | McGrail | 221/171 X |
|---|---|---|---|
| 1,340,432 | 5/1920 | Benjamin | 193/45 X |
| 2,815,113 | 12/1957 | Henderson et al. | 198/400 |
| 3,339,702 | 9/1967 | Novak et al. | 198/400 |
| 3,407,917 | 10/1968 | Lockwood | 221/173 X |
| 3,631,955 | 1/1972 | Chaplinski | 198/376 |
| 3,722,659 | 3/1973 | Aidlin et al. | 198/400 |
| 3,817,423 | 6/1974 | McKnight | 221/173 |
| 3,948,386 | 4/1976 | Nalbach | 198/384 |

Primary Examiner—John J. Love
Assistant Examiner—James L. Rowland
Attorney, Agent, or Firm—Houston L. Swenson; Arthur R. Whale

[57] ABSTRACT

Apparatus for continuously orienting bottles comprising a stationary randomly oriented bottle-holding receptacle in communication with and cooperating with a rotatable round feeding element having a plurality of equispaced holes therein, said holes in essentially axial alignment with a rotatable round bank of cooperating vertical tubes into which bottles are fed and from which bottles are delivered to an orienting-plate which orients all the bottles fed thereinto in a neck-up position and means for removing such oriented bottles from the apparatus.

2 Claims, 5 Drawing Figures

APPARATUS FOR CONTINUOUSLY ORIENTING PLASTIC AND OTHER TYPES OF BOTTLES

BACKGROUND OF THE INVENTION

1. Field of the Invention

This invention relates to an apparatus for the continuous high-speed orientation of plastic and other types of bottles. More particularly, this invention relates to a mechanism that converts randomly oriented bottles that have long to short lateral axes of from about 1.5:1 to 1:1 and short lateral axis to neck diameter dimensions of 1.15 to 1 or greater to oriented bottles having the neck thereof in the up position.

2. Description of the Prior Art

An early machine to orient objects having unsymmetrical ends is represented by U.S. Pat. No. 620,350. This invention utilized a series of cams to arrange bullets in the same orientation for greasing. Later, in 1920, U.S. Pat. No. 1,340,432 described a method for dropping bullets through a tube which was fed from a wheel which would only pick up bullets oriented in a single direction from a bed of randomly oriented bullets.

In 1957, U.S. Pat. No. 2,815,113 described a method for orienting bottles by pushing the randomly oriented bottles through a trap which would only allow one orientation to pass.

U.S. Pat. No. 3,101,832, issued in 1963, described a bottle-orienting machine which utilized a vibrating rack ascending around a cylindrical bowl cooperating with various arms and baffles to achieve orientation.

In 1967, U.S. Pat. No. 3,339,702 described a bottle-orienting apparatus which comprised a series of oppositely moving belts to aid in the orientation.

U.S. Pat. No. 3,631,955, issued in 1972, details a means for detecting a neck-down bottle, grasping such bottle and inverting it to a neck-up position.

An apparatus for conveying bottles, lying down in a position at right angles to the route of travel, over a gradually ascending rail positioned to contact the bottle in the middle, between the bottom and top, and relying on the greater weight in the bottom half to tip the bottle neck-up to one side or the other was described in U.S. Pat. No. 3,722,659, issued in 1973.

An apparatus for rectifying two-piece hard gelatin capsules was described in U.S. Pat. No. 3,817,423, issued in 1974. This invention comprised a mechanism wherein randomly oriented capsules were fed through delivery tubes into a rectifying plate. In the rectifying plate the capsules were collected in holes having a diameter greater than the larger diameter of the capsules. While disposed in such hole, the capsules contacted a means which turned all of the capsule bodies to the outside in a slot having a width slightly less than the smallest diameter of the capsule bodies.

All of the capsules, in the invention of U.S. Pat. No. 3,817,423, are held in a horizontal position by the friction fit between the capsule cap and the walls of the vertical slot between the holes in which the capsules repose in the rectifying plate and the outboard circumference thereof. After the capsules are all oriented body out, a gradually descending guide bar disposed immediately outboard of the rectifying plate contacts the capsule bodies and all the capsules are turned body down. Another means contacts the capsules and they are returned to the holes in the rectifying plate from which they are discharged by gravity.

Another U.S. Pat. No. 3,948,386, issued in 1976, described a mechanism for orienting plastic bottles, or the like, by means of vertically reciprocating push rods mounted in a bowl in which randomly oriented bottles were located.

Prior art mechanisms for orienting randomly oriented bottles are generally cumbersome and mechanically complex. These machines are expensive to construct and operate, and the complex mechanisms are subject to frequent maintenance needs.

Accordingly, it is an object of this invention to provide a means for the high-speed orientation of plastic and other types of bottles that is mechanically simple, relatively inexpensive to construct, economical in operation, and virtually free of maintenance requirements.

SUMMARY

It has now been discovered that an apparatus for the continuous high-speed orientation of plastic and other types of bottles can be comprised of: A stationary round receptacle cooperating and communicating with a rotatable round feeding element, a rotatable round delivery element, and a rotatable round orienting-plate all disposed coaxially in a vertical relationship.

The stationary receptacle is comprised of a cylinder with the axis thereof disposed vertically. A stationary cone is spatially disposed in the center of the cylinder. The base of the cone is on the same horizontal plane as the bottom of the cylinder.

The rotatable round feeding element is disposed between the base of the cone and the cylinder and has a plurality of chamfered holes disposed therein with the center line about midway between the walls of the cylinder and the base of the cone.

Affixed to the feeding element and disposed immediately therebelow is a rotatable round delivery element, which is comprised of a plurality of tubes having essentially the same inside diameter as the chamfered holes in the feeding element with which they are in communication and cooperation. Disposed in each of the tubes in a horizontal plane are a first and second course of lateral slots located about one and one-half bottle lengths apart. Flexible belts are disposed in both courses of slots.

A reorienting element comprised of the rotatable round orienting-plate attached coaxially to the delivery element cooperating with a stationary reorienting rail disposed spatially immediately below and outboard to the orienting-plate completes the apparatus. The orienting-plate has a plurality of vertical holes equal in number to the tubes in the delivery element and cooperating and in communication therewith. Each of these holes has an inwardly protruding stop at the bottom thereof extending inwardly sufficiently far to stop the bottom or shoulder of a bottle, but not so far as to stop the neck of the bottle from passing through. Vertical slots communicate between the outboard circumference of the orienting-plate and the vertical holes therein. A plurality of lateral slots are disposed in the orienting-plate and extend inwardly to about the circumferential plane defined by the inboard circumference of the vertical holes therein. The stationary reorienting rail disposed first immediately under the orienting-plate begins just inboard of the inside circumference of the vertical holes therein and is directed gradually to the outside of the orienting-plate and then upwardly following the circumference thereof to about the top thereof. Skid bars are disposed in the lateral slots of the orienting-plate exiting therefrom at an acute angle to the direction of rotation thereof immediately after the reorienting rail terminates. Any conventional means can be utilized for rotating the feeding element, delivery element, and orienting-plate concentrically in synchronization.

DESCRIPTION OF THE PREFERRED EMBODIMENTS

Figure 1:
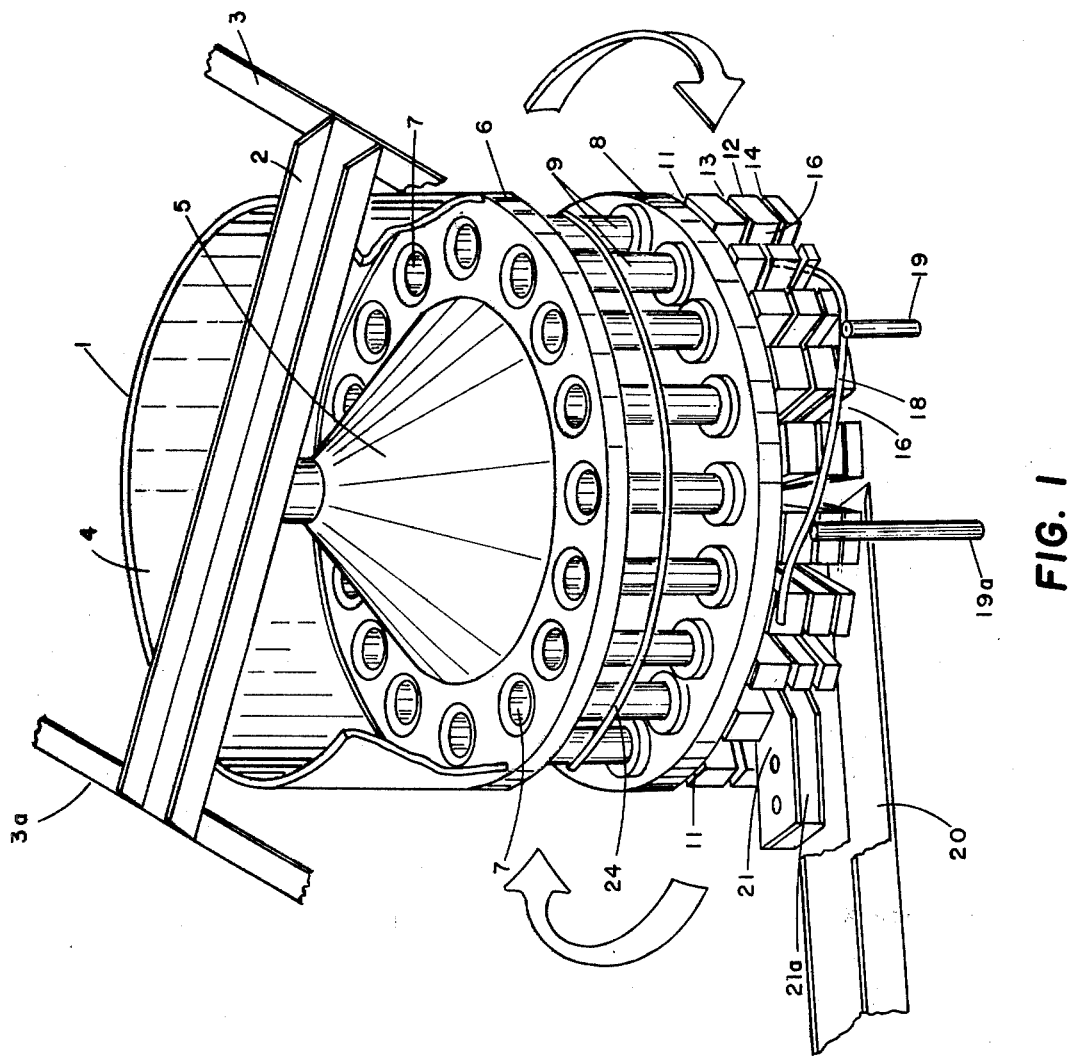
FIG. 1 is a partially cut-away perspective view of the apparatus for the continuous high-speed orientation of randomly oriented plastic and other type bottles.

In the following detailed description of the embodiments of this invention, reference is made to the accompanying drawings.

The apparatus for the continuous high-speed orientation of randomly oriented plastic and other types of bottles having a transverse axes ratio of from about 1.5:1 to 1:1 and a short body axis to neck diameter ratio of at least 1.15 to 1 comprises: (a) a stationary receptacle 1 for holding randomly oriented bottles, (b) a rotatable round randomly oriented bottle feeding element 6 spatially disposed immediately below and cooperating and communicating with said receptacle 1, (c) a rotatable round delivery element 8 comprised of a plurality of vertically disposed tubes 9 cooperating with and communicating with said feeding element 6, (d) a reorienting element comprised of a rotatable round orienting-plate 12 and a reorienting rail 18 for turning bottles positioned neck-down in said orienting-plate 12 to an upright position, and, (e) skid bars 21 and 21a for discharging neck-up oriented bottles from said orienting-plate 12 onto discharge conveyor 20.

The novel apparatus for the continuous high-speed orientation of randomly oriented bottles which is embodied in this invention is structured and operates as described hereinafter.

In FIG. 1, a cylindrical receptacle 1 is shown connected to a stationarily disposed support channel 2. The support channel 2 is depicted as connected to support arms 3 and 3a. The means shown to support the receptacle 1 are only intended as illustrative as the support of the receptacle is not a part of this invention.

Receptacle 1 is shown in the cut-away perspective as having an inside diameter slightly less than the outside diameter of feeding element 6. The design could just as well have the outside periphery of feeding element 6 just inside the inside diameter of receptacle 1. The clearance between receptacle 1 and feeding element 6 should be only that needed to allow for the free and unrestricted rotation of the feeding element 6. The vertical sides of receptacle 1 are indicated by 4. The height and width of receptacle 1 should be such that the volume defined thereby is sufficient to hold a quantity of randomly oriented bottles great enough to assure a continuous supply to the feeding element 6.

Also shown in the cut-away perspective of FIG. 1 is a cone 5 which rises just inboard of the inside periphery of the circumferential chamfered holes 7 in feeding element 6. The truncated cone 5 is depicted as attached to support channel 2. This cone 5 serves the purpose of directing the flow of randomly oriented bottles downwardly and toward chamfered holes 7 in feeding element 6.

As the base of stationary cone 5 meets the upper surface of feeding element 6 just inboard of the inside circumference of chamfered holes 7, and the walls 4 of receptacle 1 meet the outer periphery of feeding element 6 just outboard of the outside circumference of chamfered holes 7, the randomly oriented bottles in receptacle 1 are gravity-fed toward chamfered holes 7, and there are, consequently, no spaced where the bottles can come to rest and not be involved in the feeding operation.

Vertically disposed immediately below the feeding element 6 is a rotatable round bank of tubes 9 which comprises the delivery element 8 of this invention. The tubes 9 are axially aligned with the chamfered holes 7 in the feeding element 6. The delivery element 8 is attached to feeding element 6.

On the outboard side of each of the tubes 9, there is disposed a first lateral slot 10. The lateral slots 10 are on the same horizontal plane around the circumference of the tubes 9 of delivery element 8.

Figure 3:
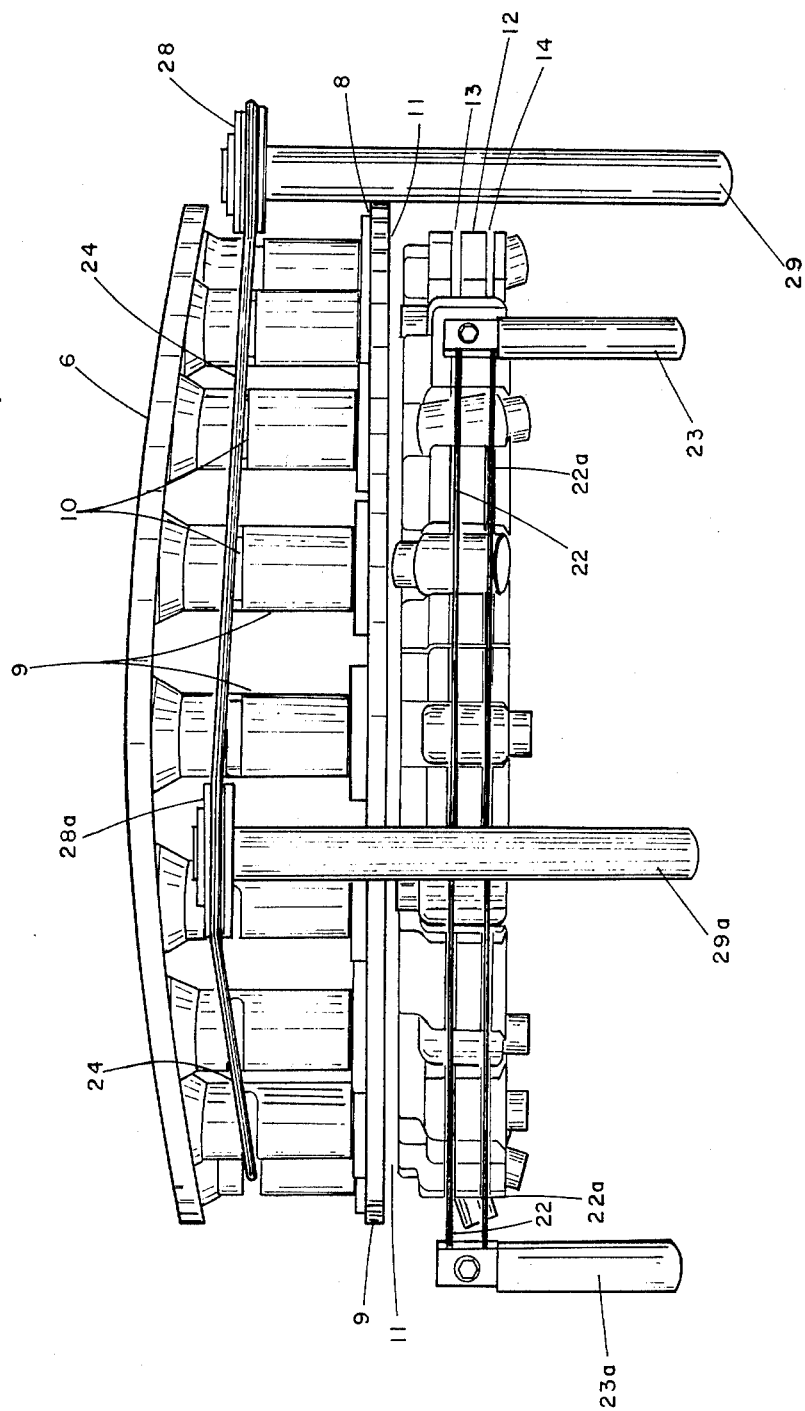
FIG. 3 is a segmented elevation view of the apparatus of FIG. 1 showing that part of the mechanism wherein the bottles to be oriented are in the orienting-plate immediately ahead of the reorienting rail.

A first idler pulley 28, shown in FIG. 3 and a second idler pulley 28a, disposed about 15° to about 45° apart in the direction of rotation of the randomly oriented bottle-orienting apparatus, and from about 90° to about 120° are located at points outboard of tubes 9 in following the discharge means, the same horizontal plane as the lateral slots 10 in the tubes 9. A first flexible belt 24 is disposed around idler pulleys 28 and 28a and in lateral slots 10 in tubes 9.

When the apparatus of this invention is operated, the randomly oriented bottles are fed through the chamfered holes 7 in feeding element 6 into the bank of tubes 9. The bottles fall by gravity down tubes 9 until they are stopped by belt 24 which prevents the bottles from falling farther until the delivery element 8 reaches a point in its rotation where belt 24 leaves the lateral slots 10 in tubes 9 to go around idler pulley 28. At this point in the operation, bottles which have been prevented from falling below belt 24 are free to fall farther in tubes 9.

Figure 2:
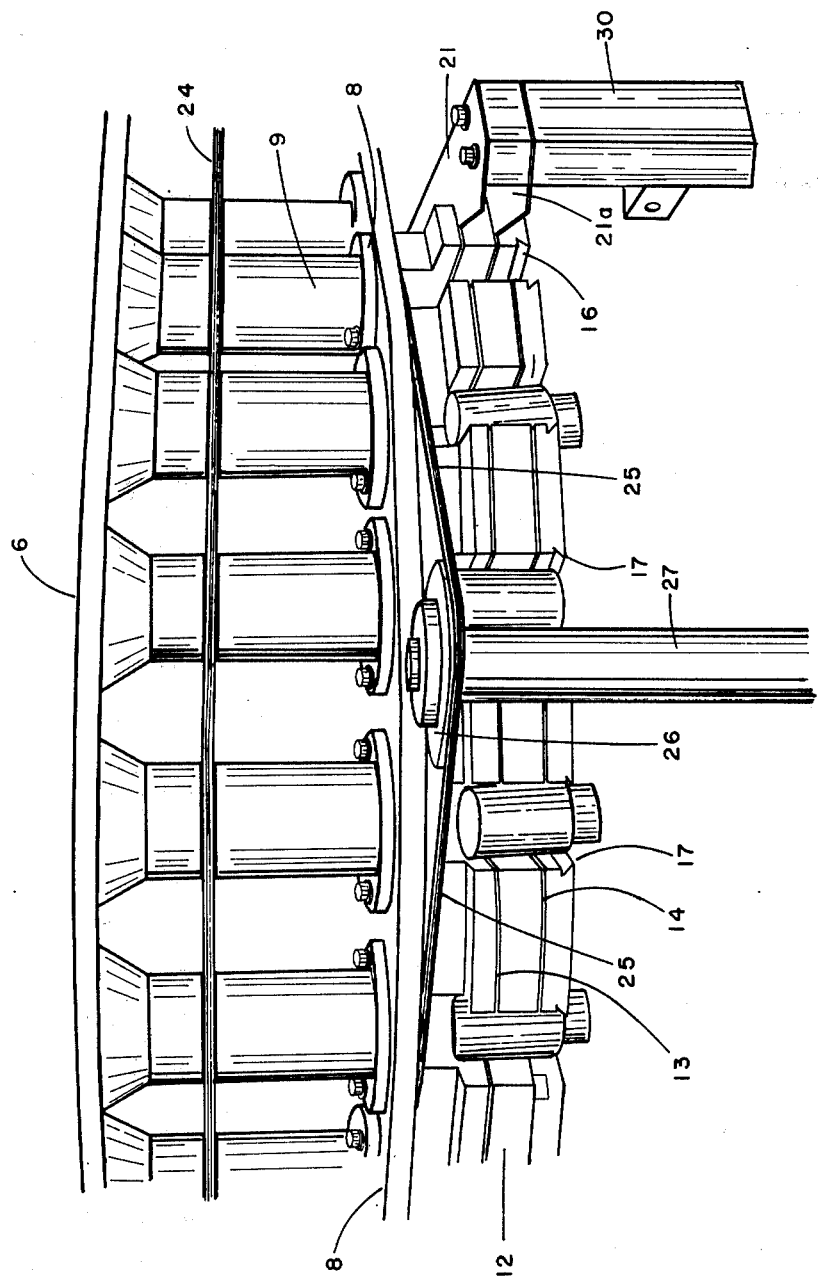
FIG. 2 is a segmented elevation view of the apparatus of FIG. 1 picturing that part of the mechanism immediately following the point of discharge.

Attached to the delivery element 8 is an orienting-plate 12 which receives the bottles from the delivery element 8. The orienting-plate 12 is disposed at a distance of about one and one-half bottle lengths from the first lateral slots 10 in tubes 9. Immediately above the orienting-plate 12 there is disposed in each of the tubes 9 a second course of outboard lateral slots 11, which in turn accommodates a second flexible belt 25. This second belt is disposed around a third idler pulley 26, shown in FIG. 2. The third idler pulley 26 is positioned outboard of lateral slots 11 and in the same horizontal plane therewith. The idler pulley 26 is supported by a post 27 and is positioned at from about 100° to about 180° in the direction of rotation of the apparatus of this invention from the first idler pulley 28.

In operation, the bottles which have fallen below the first flexible belt 24 in the area where belt 24 has left the delivery element 8 to go around the first idler pulley 28 are stopped by the belt 25. As the bottles, which have been stopped by belt 25 move around the apparatus, as the orienting-plate 12 turns, they reach a point where belt 25 leaves the lateral slots 11 to engage idler pulley 26. At this point the bottles are free to fall into the orienting-plate 12.

Figure 4:
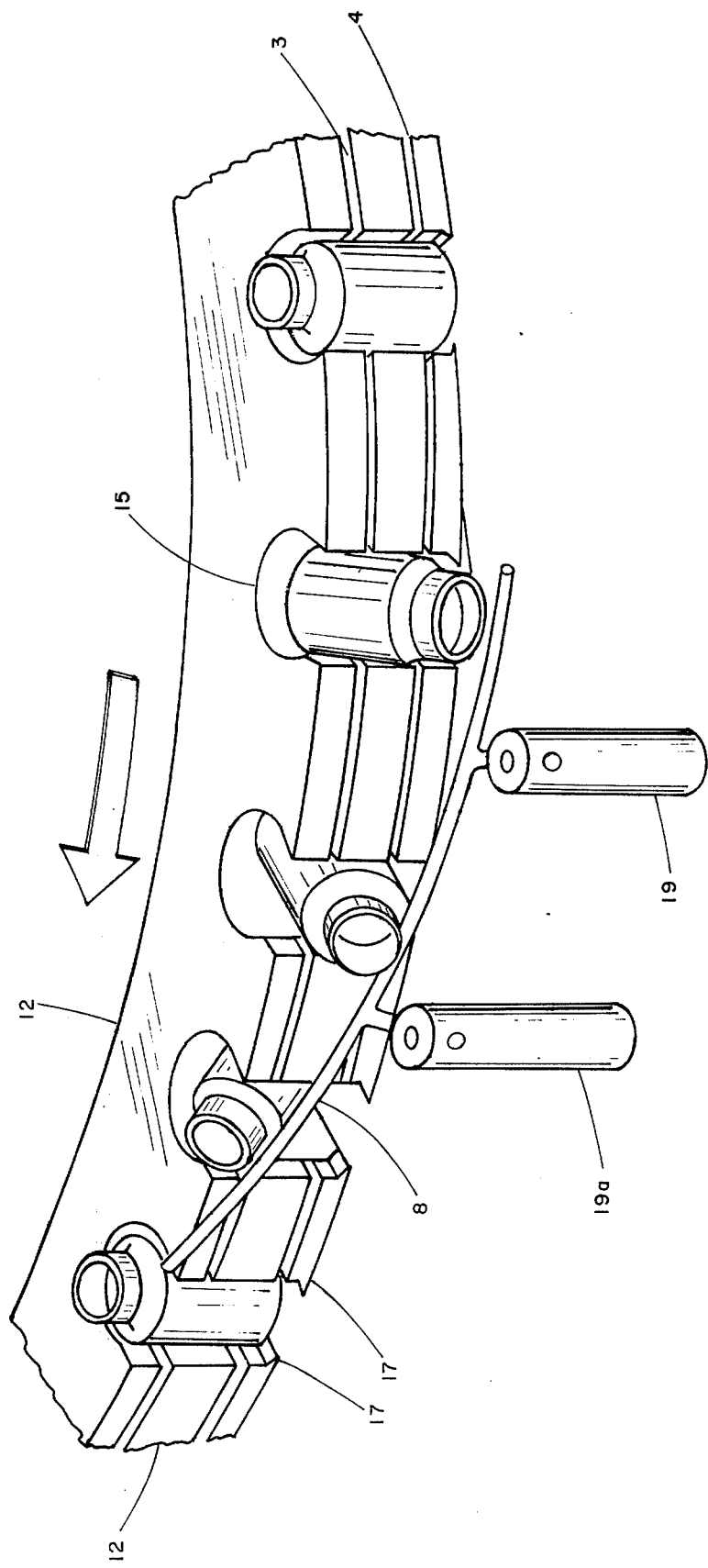
FIG. 4 is a segmented perspective view of the apparatus of FIG. 1 showing the action of the reorienting rail in turning neck-down bottles upright.

The orienting-plate 12, a section of which is shown is detail in FIG. 4, receives the bottles from the delivery element 8. In the orienting-plate 12 there are a plurality of vertical holes 15 of essentially the same inside diameter as the inside diameter of tubes 9 which deliver the randomly oriented bottles to the orienting-plate 12. These holes 15 communicate with and cooperate with tubes 9 and are axially aligned therewith. Moreover, there are the same number of holes 15 in the orienting-plate 12 as there are tubes 9 in the delivery element 8. Extending from the outside circumferential face of orienting-plate 12 to the outside circumference of holes 15 therein are vertical slots 16 disposed to communicate with each of the holes 15. The vertical slots 16 are of a width that is slightly less than the inside diameter of holes 15.

When a randomly oriented bottle is released from delivery element 8 into a hole 15 in orienting-plate 12 as belt 25 is circling idler pulley 26, the bottle is prevented from falling through hole 15 by stops 17 which are protuberances which extend inwardly from the bottom of orienting-plate 12 sufficiently far to arrest the fall of a bottle either by the bottom or by the shoulder, if the bottle is falling neck down. Stop 17 is terminated at a point where the opening is sufficient to allow the neck of the bottle to project below the bottom plane of the orienting-plate 12.

A plurality of laterally disposed slots are provided in orienting-plate 12 extending from the outside circumferential face thereof to approximately the vertical circumferential plane defined by the inboard circumference of the plurality of holes 15 disposed in the orienting-plate 12. In FIGS. 1 through 5, two lateral slots are shown as 13 and 14, respectively. As a matter of construction, two slots are appropriate, and preferred, for accomplishing the purpose of the reorienting element.

Disposed in each of lateral slots 13 and 14 is a flexible band, shown in FIG. 3 as 22 and 22a, respectively. Such bands 22 and 22a extend from a point from about 10° to about 45° in the direction of the rotation of the orienting-plate from the point where the first belt 24 leaves the first lateral slots 10 to a point just ahead of the beginning of the reorientating rail 18. The bands are supported at either end by posts 23 and 23a, shown in FIG. 3. The bands position the randomly oriented bottles against the inboard circumference of holes 15 for contact with the reorientating rail 18. These restraining bands provide a refinement to the operation of the apparatus of this invention but are not critical to it.

Bottles which have fallen into holes 15 with their neck up pass by reorientating rail 18 without making contact therewith. Bottles which have fallen into holes 15 with their neck down are turned approximately 180° to a neck-up position as such bottles contact reorientating rail 18 and are caused gradually to be turned as the neck of the bottle rides the reorientating rail 18 as the latter courses first outwardly and then upwardly.

Reorientating rail 18 is stationary, disposed beneath and outboard of the orienting-plate 12 and cooperates therewith. The reorientating rail 18 originates immediately beneath orienting-plate 12 at a point just inboard of the inboard circumferential plane of holes 15 and courses gradually outward until it clears the outboard circumferential plane of the orienting-plate 12. The reorientating rail 18 then turns and progresses gradually upward alongside the orienting-plate 12 until it reaches a point just above the top thereof where it turns downwardly to the horizontal and continues until the takeoff point is reached. The reorientating rail 18 is shown in its relation to orienting-plate 12 in FIGS. 4 and 5. Once the reorientating rail 18 comes outboard of the orienting-plate 12 it follows the curvature thereof. Reorientating rail 18 is supported by posts 19 and 19a.

Figure 5:
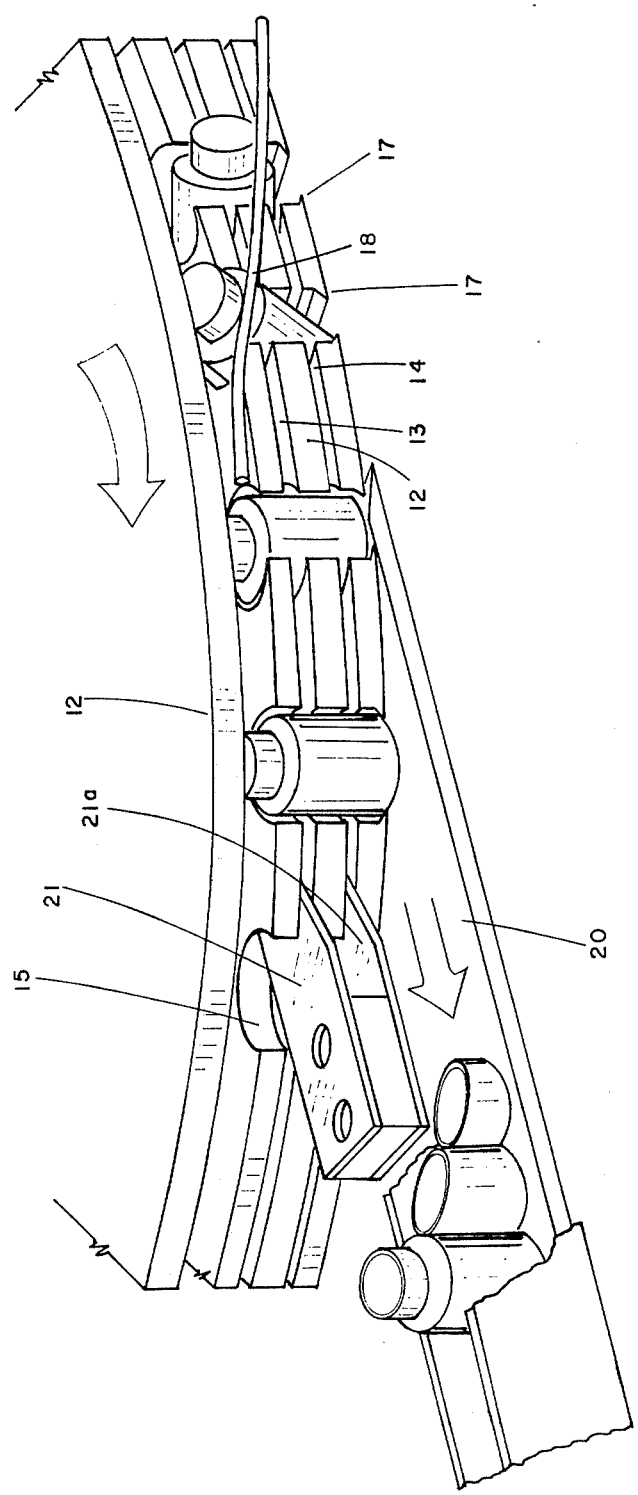
FIG. 5 is a partially cut-away perspective view of the discharge element of the apparatus of FIG. 1.

As soon as all of the bottles in holes 15 are oriented neck-up, they are removed from the orienting-plate as they contact skid bars 21 and 21a, shown in FIG. 5. Skid bars 21 and 21a are disposed in lateral slots 13 and 14, respectively. They extend inwardly to a point adjacent to the inside circumference of the respective lateral slots 13 and 14. The skid bars 21 and 21a are disposed in the lateral slots 13 and 14 at an appreciable obtuse angle to the direction of rotation of the apparatus of this invention. When the neck-up bottles contact the skid bars 21 and 21a, as the apparatus rotates, they are gradually moved outwardly through vertical slots 16 onto a discharge conveyor 20.

The chamfer on holes 7 in feeding element 6 is not considered essential for the flow of bottles from the randomly oriented pack in receptacle 1 to the delivery element 8, but it was found that it was beneficial to construct the holes 7 in such a manner. In the construction of the feeding element 6, the holes 7, through which the bottles are fed to the delivery element 8 and thence to the orienting-plate 12, are of a diameter slightly greater than the maximum transverse lateral dimension of the bottles being oriented. The inside diameter of the tubes 9 and the vertical holes 15 is essentially the same diameter as holes 7. Vertical slots 16 are slightly less in width than the diameter of the next above-described dimensions. The depth of the vertical slots 16 in the orienting-plate 12 is such that the neck of a bottle being oriented neck-up by reorientation rail 18 will always extend outboard of such slots and remain in contact with the reorienting rail 18.

Although any reasonable number from about 10 or 12 to as many as 100 or more tubes 9 and cooperating holes 7 in the feeding element and 15 in the orienting-plate 12 can be employed in an apparatus for the continuous orientation of plastic and other types of bottles, it was found that the greatest efficiency was achieved when the number of orientation positions was from about 25 to about 60.

While the relationship of the various elements that constitute the apparatus of this invention is shown in FIGS. 1 through 5, it is to be understood that elaborate variations can be made in these elements without deviating from the spirit of this invention. For example, the length of the tubes 9 which serve as the delivery means in getting the randomly oriented bottles to the orienting means can be varied widely from the relative length shown in FIGS. 1 and 2. It is only essential that these tubes are sufficiently long to accommodate 1 or more bottles between the feeding element 6 and the first flexible belt 24, preferably a minimum length equal to one and one-half the length of one of the bottles being oriented.

Any conventional means can be employed to rotate the synchronized and cooperatively connected feeding element 6, delivery element 8, and orienting-plate 12. One favored means comprises affixing each of the elements and the orienting-plate to a vertical shaft, anchoring one end thereof at support bar 2 with the other end of the shaft being supported by a properly aligned bearing. A pulley affixed to the lower end of the shaft can be connected to a motor by a belt drive. Or, if it is preferred, a geared connection can be effected.

What is claimed is:

1. An apparatus for the continuous high-speed orientation of randomly oriented plastic and other types of bottles having a transverse axes ratio of from about 1.5:1 to 1 comprising:
   (a) a stationary receptacle for holding randomly oriented bottles;
   (b) a rotatable round randomly oriented bottle feeding element, said feeding element spatially disposed immediately below said receptacle and cooperating and in communication therewith;
   (c) a rotatable round delivery element connectedly disposed immediately below said feeding element, said delivery element comprised of a plurality of vertically disposed tubes cooperating and in communication with said feeding element, and means for regulating the delivery of individual bottles from said feeding element to an orienting element;
   (d) a rotatable round orienting-plate disposed immediately below said delivery element and connected thereto, said orienting-plate having vertical holes therein for receiving the bottles being oriented, each of said vertical holes having a vertical portion exposed at the exterior of said orienting plate with a width sufficient for discharge of bottles therethrough and having an inwardly protruding stop at the bottom thereof which stops and holds a bottle either by its base or its shoulder;
   (e) means for engaging the neck of a bottle stopped in said vertical hole by the shoulder and moving said bottle by the neck approximately 180° to an upright position while said bottle is disposed in said vertical hole, said means comprising a reorienting rail stationarily spatially disposed with respect to the orienting-plate, said bar beginning at a point immediately below the orienting-plate and inboard of the circumference of the vertical holes in the orienting-plate and directed gradually outwardly until it comes outboard of the orienting-plate and is then directed upwardly until it terminates at a position higher than the orienting-plate immediately before said bottles are discharged from the orienting-plate;
   (f) means for discharging the bottle from said vertical hole; and
   (g) means for effecting a synchronized rotation of said feeding element, delivery element, and orienting-plate.

2. An apparatus for the continuous high-speed orientation of randomly oriented plastic and other types of bottles having transverse axes of from about 1.5:1 to 1:1 and a body short axis to neck diameter of at least 1.15 to 1 comprising:
   (a) a receptacle for holding randomly oriented bottles;
   (b) a rotatable round feeding element spatially disposed immediately below said receptacle and serving as the bottom thereof, said feeding element having a circumferential row of holes disposed therein near the periphery thereof;
   (c) a rotatable round bank of vertical tubes disposed immediately below and connected to and cooperating with said feeding element, said tubes matching in number the number of holes in said feeding element and circumferentially and axially aligned therewith;
   (d) a first course of lateral slots disposed on the outboard side of each of said vertical tubes;
   (e) a first and a second idler pulley located from about 15° to about 45° apart and from about 90° to about 120° in the direction of rotation from the bottle discharge means and outboard of said rotatable bank of tubes and in lateral alignment with said first course of lateral slots;
   (f) means for supporting said idler pulleys;
   (g) a first flexible belt disposed in said first course of lateral slots and around said first and second idler pulleys;
   (h) a second course of lateral slots disposed below said first course of lateral slots on the outboard side of each of said vertical tubes;
   (i) a third idler pulley located outboard of said rotatable bank of tubes from about 120° to about 160° from said first idler pulley and in lateral alignment with said second course of lateral slots;
   (j) means for supporting said third idler pulley;
   (k) a second flexible belt disposed in said second course of lateral slots and around said third idler pulley;
   (l) a rotatable round orienting-plate connected to the lower end of said rotatable round bank of cylindrical tubes;
   (m) a plurality of vertical holes disposed in said orienting-plate, said vertical holes having essentially the same diameter, in axial alignment with and matching in number the number of vertical tubes in said delivery element;
   (n) a protruding stop at the bottom of each vertical hole extending inwardly a sufficient distance to allow the passage of the neck of the bottle being oriented but stopping the shoulder or the bottom of such bottle;
   (o) a plurality of vertical slots disposed between said vertical holes and the outside circumferential face of said orienting-plate, said vertical slots having a width essentially the same as the diameter of said vertical holes;
   (p) two circumferential lateral slots disposed in said orienting-plate and equispaced between the top and bottom thereof, said lateral slots extending from the outside circumferential face of said orienting-plate to approximately the vertical circumferential plane defined by the inboard circumference of the vertical holes in said orienting-plate;
   (q) a flexible band disposed in each of said lateral slots from a point immediately following the position where the bottles being oriented are delivered to the orienting-plate to a point immediately before the position where the neck of such bottles, which are inverted in the orienting-plate, contact the reorienting rail;
   (r) means to support said flexible bands;
   (s) a reorienting bar stationarily spatially disposed with respect to the orienting-plate, said bar originating at a point immediately below the orienting-plate and inboard of the circumference of the vertical holes in the orienting-plate and directed gradually toward the outside circumference of the orienting-plate and then upwardly in the same radius as that of the orienting-plate to a point immediately above the top plane of such plate;

(t) means for supporting said reorienting bar;

(u) a first and a second skid bar, one of which is disposed within each of the two lateral circumferential slots in the orienting-plate, extending into said slots to approximately the inboard vertical circumferential plane defined by the inboard circumference of the plurality of vertical holes in the orienting-plate and exiting therefrom at an acute angle to the direction of rotation thereof;

(v) means for supporting said skid bars; and (w) means for rotating the feeding element, delivery element and orienting-plate.

* * * * *